US009952581B2

(12) United States Patent
Fagan

(10) Patent No.: US 9,952,581 B2
(45) Date of Patent: Apr. 24, 2018

(54) SYSTEM AND METHOD FOR NC PLASMA CUTTING OF METAL FABRIC

(71) Applicant: Matthew Fagan, Middle Park (AU)

(72) Inventor: Matthew Fagan, Middle Park (AU)

( * ) Notice: Subject to any disclaimer, the term of this patent is extended or adjusted under 35 U.S.C. 154(b) by 33 days.

(21) Appl. No.: 15/179,006

(22) Filed: Jun. 10, 2016

(65) Prior Publication Data

US 2016/0363922 A1 Dec. 15, 2016

Related U.S. Application Data

(60) Provisional application No. 62/174,473, filed on Jun. 11, 2015.

(51) Int. Cl.
| | |
|---|---|
| G06F 19/00 | (2011.01) |
| G05B 19/402 | (2006.01) |
| B23K 10/00 | (2006.01) |
| G05B 19/18 | (2006.01) |
| B23K 37/02 | (2006.01) |
| B23K 101/22 | (2006.01) |

(52) U.S. Cl.
CPC ............ *G05B 19/402* (2013.01); *B23K 10/00* (2013.01); *B23K 10/006* (2013.01); *B23K 37/0258* (2013.01); *G05B 19/182* (2013.01); *B23K 2201/22* (2013.01); *G05B 2219/45041* (2013.01)

(58) Field of Classification Search
CPC .. G05B 19/402; B23K 37/0258; B23K 10/00; B23K 2201/22
See application file for complete search history.

(56) References Cited

U.S. PATENT DOCUMENTS

| | | | | |
|---|---|---|---|---|
| 5,597,498 A | * | 1/1997 | Sunayama | ........... B23K 9/1274 219/124.33 |
| 5,729,345 A | * | 3/1998 | Ludewig | ................ B23K 31/12 356/394 |
| 6,201,207 B1 | * | 3/2001 | Maruyama | ............. B23K 7/102 219/121.39 |
| 7,071,441 B1 | * | 7/2006 | Bulle | ..................... B23K 10/00 219/121.39 |
| 7,469,620 B2 | | 12/2008 | Fagan | |

(Continued)

FOREIGN PATENT DOCUMENTS

| | | |
|---|---|---|
| EP | 0 696 491 | 2/1996 |
| EP | 2 135 701 | 12/2009 |
| WO | WO 2004/087362 | 10/2004 |

OTHER PUBLICATIONS

Application No. 16173905.7 extended European search report, dated Sep. 28, 2016, 9 pages.

*Primary Examiner* — Vincent Tran
(74) *Attorney, Agent, or Firm* — Lathrop Gage LLP

(57) ABSTRACT

Systems and methods NC plasma cut a metal fabric based upon a two-dimensional cutting path. An NC cutting machine is controlled to make a first pass along the cutting path with the laser height measuring device to collect height data from the metal fabric positioned on a bed of the NC cutting machine. Positions for starting and stopping a plasma arc of a cutting torch of the NC cutting machine are determined based upon the height data. An enhanced NC program is generated based upon the cutting path, the height data, and the positions for starting and stopping the plasma arc, to control the NC cutting machine to cut metal of the metal fabric along the cutting path.

19 Claims, 10 Drawing Sheets

NC plasma gantry cutting machine preparing to cut a metal matrix material

(56) References Cited

U.S. PATENT DOCUMENTS

| | | |
|---|---|---|
| 8,865,056 B2 | 10/2014 | Fagan |
| 8,987,636 B2 * | 3/2015 | Fagan .................... B23K 7/001 |
| | | 219/124.21 |
| 2009/0312862 A1 * | 12/2009 | Fagan .................. B23K 10/006 |
| | | 700/160 |
| 2012/0242015 A1 * | 9/2012 | Fagan ................ B23K 37/0288 |
| | | 266/59 |
| 2014/0113527 A1 * | 4/2014 | Lindsay .................. B23K 5/00 |
| | | 451/5 |
| 2014/0180465 A1 * | 6/2014 | Nakano .............. G05B 19/4097 |
| | | 700/160 |
| 2014/0236339 A1 | 8/2014 | Fagan |
| 2014/0312018 A1 * | 10/2014 | Leslie .................... B23K 26/38 |
| | | 219/121.81 |
| 2015/0088800 A1 | 3/2015 | Kazachkov et al. |

* cited by examiner

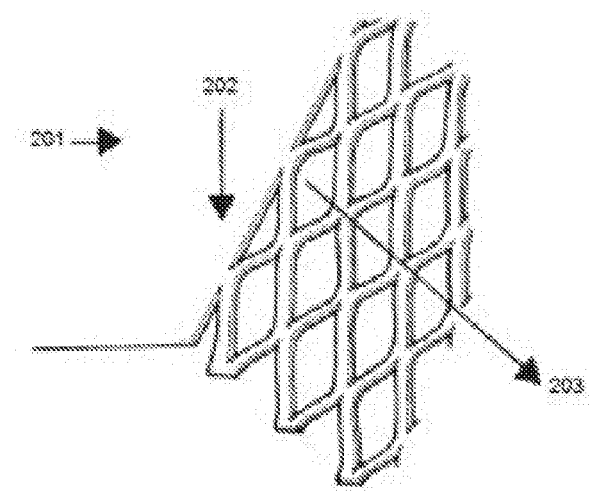
FIG. 2  Expanded metal production from plate
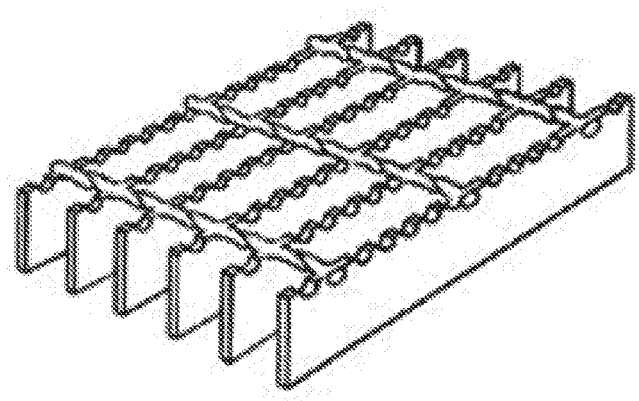
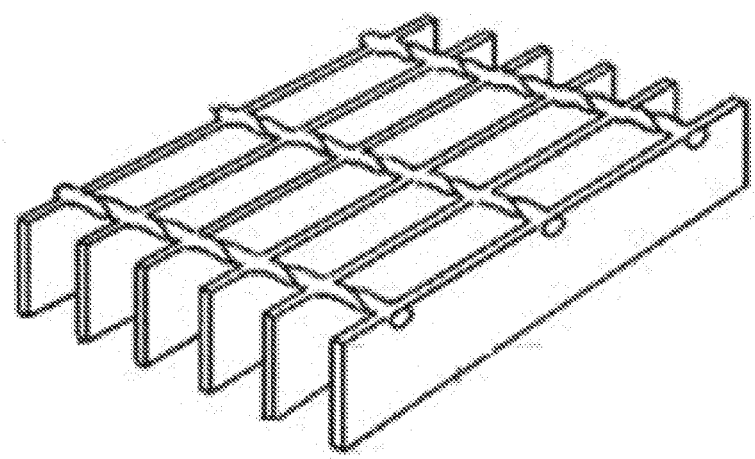
FIG. 3A  Crossbar and Bearing grid showing serrated and non serrated bars Punched plate with round holes.

One type of simply woven material, over and under

Rectangular square matrix material

Line scan along expanded metal showing measurements in (XYZ) as lines

The same scan shown in the XZ plane revealing not only holes in the material but the shape of the sloped segments of the expanded metal material.

A simple circle shown as an XYZ scan.  The missing material is obvious

The same scan as an isometric representation where the exact shape of the top surface is dramatic and the lengths of solid material is highly variable as are the gaps.

A single segment of figure 5 showing the optional derivation of torch azimuth and tilt from the top surface Torch AC axes for optional bevel head 125, 128 as shown in figure 1

SYSTEM AND METHOD FOR NC PLASMA CUTTING OF METAL FABRIC

RELATED APPLICATIONS

This application claims priority to U.S. Patent Application Ser. No. 62/174,473, titled "System and Method for NC Plasma Cutting of Metal Fabric," filed Jun. 11, 2015, and incorporated herein by reference.

FIELD OF THE INVENTION

This disclosure relates to the field of part cutting from metal fabrics. More particularly, this disclosure pertains to the use of a plasma torch in a numerically controlled machine for computer controlled automatic plasma cutting of near flat metal material with holes.

BACKGROUND

Conventional solid metal plate cutting technologies are well known in the art. These include oxy acetylene, plasma, water jet and laser. Each has their area of application. This disclosure is specifically restricted to plasma arc cutting of metals which include steel and aluminum.

Computer guided machines or Numerically Controlled (NC) machines appeared in the 1970s, machines which followed coordinates given in a plain English language known as Numeric Control or NC programs. Plasma cutting itself appeared in the 1940s as an extension of electric arc welding, carrying the very high currents in a plasma gas which melted rather than burned the metal.

The rapid drop in the price of computers after 2000 meant that computer controlled shape cutting has become affordable and standard in workshops. However the application of automated cutting of metal fabrics has met with two problems.

The first problem is height control, a problem even for nominally flat material as the plasma torch is sensitive to mm changes in height and must be kept with a narrow range, around 6 mm to 12 mm. With fabricated metal products, the height of the material can change dramatically, often by nearly the whole material thickness of say 14 mm but where cutting is still required.

Traditional NC two axis (XY) plasma cutting machines use a feedback device to control the Z axis. This feedback device utilizes plasma arc voltage to determine and maintain torch height, adjusting the height up if the voltage drops and adjusting the height down if the voltage increases. The feedback device operates independently of the NC control and is turned on or off. The feedback device presumes that the surface height changes slowly and smoothly and has problems with height changes resulting from sharp edges and holes. Expanded metals in particular can vary suddenly by 14 mm in surface height. Traditional NC THC (Torch Height Control) devices cannot react quickly enough for the sharp slopes. As the feedback device operates independently from the NC control, it cannot detect holes in the material being cut and therefore causes the plasma torch to plummet into these holes, causing mechanical damage to components (e.g., cutting torch) of the NC cutting machine.

Secondly, there are large holes in fabricated material as part of the fundamental design of the material. Worse, while generally regular, in a given NC path, these are unpredictable. Holes are a disastrous problem for traditional NC plasma cutting machines designed for continuous cutting of solid plate. There is little or no provision for running off the plate or into a hole. This can damage the torch of the NC cutting machine.

Plasma torches produce arcs which reach 10,000 C where the arc conducts to nearby metal. Movement off a metal surface usually means the arc will fail or in the worst case, blow back into the plasma torch, destroying the torch. Plasma is usually used to cut solid, flat material like steel plate. It is rarely if ever used to cut materials with holes. A high frequency high voltage pilot arc is used to test for conduction to metal and if successful, an attempt is made to establish a high current Direct Current plasma arc of between 10 and say 400 amps at a voltage between 100 and 180 volts DC. This technique is well established in the art.

It has to be mentioned too that the problems of cut width or kerf are still present even though cutting such difficult material. As plasma cut width is not trivial and ranges from 2 mm to 5 mm, the desired cut path has to be offset by half the width of cut on the side of the torch which is in the scrap. This can be a complex calculation which is a standard part of NC path control and has to be solved for accurate cutting.

SUMMARY

To address the problem of plasma cutting material with holes, the plasma cutting industry has recently created hand held plasma torches which quickly attempt to restart the pilot arc when the main arc is automatically turned off for lack of material. This allows some hand cutting across holes when the main plasma arc turns off for lack of material. This avoids the nuisance of operating a hand trigger. While this has made cutting of some materials by hand plasma easier with careful operation, it is not clear how successful this has been in practice. NC cutting of very flat materials with relatively small holes has been successfully with such torches, presumably with the height control turned off as well. However it has not led to general automation of fabricated metals with big holes and sudden height changes as with steel reinforcing or expanded metal.

Given that some metal fabrics have sharply sloping faces leading into holes, as compared to simple punched plate, there is a need to vary Z substantially and quickly and even tilt the torch automatically to avoid collisions with the torch tip. This is not a necessary condition for cutting flat materials with large holes with vertical sides as in punched plate but a refinement for materials with holes with steep sloping metal as with expanded metal.

These include but are not limited to grating for walkways which is made as a lattice of metal bars, expanded metal which is punched from sheet and plate and other classes of metal fabrics.

Metal fabrics are created for many uses which include through visibility, holes for water and solids, ventilation, light weight, decoration and more. Reinforcing material formed from welded rod is another very common fabricated metal material produced in great quantity by welding bars to other bars in a rectangular grid. Other metals fabrics with holes are simply flat sheets or plates with punched holes of varying shape and patterns to make them lighter and porous.

Fabricated grating and expanded metal are perhaps the most complex to cut and used extensively for walkways, fire escapes, outside service areas as and on ships and wet outside areas where secure walkways must be provided which will not retain water or dirt or other material. To cut hatches, round corners and indentations for clearance and access holes for people and plumbing is particularly difficult and generally not able to be automated.

While some materials can be cut by hand, many fabricated materials like concrete reinforcing are made to order on rectangular size because of the cost and effort in cutting on site. Otherwise they are bulk produced to standard sizes and rectangular. There are specialist machines which clamp materials and use rotating saws and grinding wheels. Vibration is a big problem as the ends of the fabric are generally impossible to restrain and this make both sawing and grinding difficult and perhaps dangerous for operators.

The automatic cutting of such material has been a continuing problem for the metal processing industry. Grating is generally cut by hand held plasma or oxy torches or in straight lines by large saws or grinders which hold the material firmly with clamps. Expanded metal is difficult to cut even by hand torch. Reinforcing mesh is included in this set and this can be cut by long handled bolt cutters or by electric side grinders or portable shears but can easily and quickly be cut by the disclosed embodiments to any desired shape or nest of shapes.

All of the hand methods of cutting metal fabric involve skill, risk and take time. Like all hand cutting, it is difficult to cut straight lines or circles.

Plasma is particular suitable as the material does not have to be clamped and there is no vibration as there is no touching. However plasma arcs have their own problems as the distance from the workpiece has to be strictly maintained and you cannot maintain the arc over a hole and risk severe damage to the torch in blowback of a 10,000 C jet stream of gas.

However using the disclosed embodiments, arbitrary cuts and shapes can be cut automatically and quickly and safely. This can be to simply trim the material at an angle, contour the outside for clearance or to cut a shape from the material. It is even possible to cut nests of parts like circles, saving a major amount of material. This is significant as fabricated material is often three times as expensive per ton as flat material.

The essential idea of the disclosed embodiments is to start with a traditional NC program as would be required for cutting a shape from flat plate. This is used not for cutting but to drive a height measuring laser over the proposed path. In this first scan, the height of the material is stored as Z at regular points along the path X,Y, effectively also noting the gaps in the material. The laser can safely ignore points under the bottom limit of the plate. This is measurement without touching.

Then the height data is added to the NC program to generate an updated NC program within the computer that includes the Z component and skips over the gaps, creating a true 3D contour in XYZ for the irregular surface while turning the plasma torch on and off as required with near instant edge starts instead of piercing.

To cut such material in the disclosed embodiments, a reasonably common gantry machine is used. In this the material is placed flat on the cutting bed and does not move and in the disclosed embodiments, it is not mechanically touched at any time. No special restraint is required before or during or after cutting.

The disclosed embodiments solve the cutting problems with two distinct passes of the cutting machine carries the plasma torch. A first pass is used to survey the material to be cut, usually based on a pattern passed as NC code or simply as a series of lines and arcs without reference to the material to be cut.

This is not necessary for simple shapes like circles, semicircles and lines. Only the required XY path must be specified but for many potential users an NC program is a convenient format. It also allows existing NC programming systems to be used to cut parts and even nests of parts on such a machine without specific provision for the material.

This first NC program or path of lines and arcs is used without cutting to guide a height detecting laser which measures torch height along the proposed cutting path or nest of paths. In this first scan, the height of the material Z below a constant point at (X,Y) is measured and remembered. Where material is missing, no height is registered. As most materials have a defined top and thickness, erroneous measurements can be discarded with confidence.

These XYZ values are examined for errors, smoothed and the result used to describe the surface height Z against position XY required. The NC machine is now aware of the height along the desired path and also any missing material or holes with specific start and stop points for cutting.

On analysis, it is clear which parts of the path are over metal and which are not. This is the first requirement, to know when to turn the torch on and off. The second piece of information is critical for fabricated material rather than punched material, as the height changes quickly. A cross section of reinforcing may yield a circular cross section. Other material such as expanded plate is a series of slopes more akin to ocean waves. An arbitrary path makes the problem a lot worse and the path complex, for which see the detailed images later.

Then the NC code is rewritten using this information. On the second pass the material is cut by the plasma, turning on an off as registered in the first pass when passing over material with the Z height as measured in the first pass. Optionally the torch is angled in direction and tilt to maximize clearance and optimize cutting.

As a further and optional refinement in materials where the surface is substantially sloped and the vertical movement is large as can occur in expanded metal, the ability to rotate and tilt the torch can also be included in the NC program, minimizing collisions and optimizing penetrations. This is done by using the instantaneous direction of the cut to determine the azimuth angle of the torch and the slope of the surface to generate the tilt angle as described herein. For this see the description of FIG. 6.

Refinements to the disclosed embodiments include:
1. Input of NC code used for SCAN. All that is really needed is the shape to be cut, but this might be more simply provided by standard NC code as used to cut plates in a conventional way. Either approach is suitable.
2. Smoothing, using one or more algorithms, of the scan points and lines to eliminate edge effects. When approaching or departing material, the laser spot has a physical size and the reflection from the surface is used to calculate distance. However physical obstructions and loss of signal can give odd effects at the ends, which have to be eliminated. A sudden change of height within say 1 mm of the edge has to be discarded. These effects can also occur on sharp surfaces which are still solid.
3. Compression, using one or more algorithms, of the scan points and lines to provide smoother XYZ performance with smaller NC programs, removing unnecessary small movements which can produce shaking and slow cutting. This compression can be as large as 98%.
4. Continuous orientation and inclination of the plasma torch. This is only necessary in some cases but particularly with expanded metal where the metal surface can be closer to vertical than horizontal. See FIG. 6 description.

5. Kerf compensation is still required as for all cutting. It is a standard aspect of all cutting where the width of cut is not negligible. Ignoring the width of cut produces errors as big as the cut width in the final part or hole size, so they cannot be ignored and must be accommodated automatically.

The disclosed embodiments provide a remarkably cheap and simple solution to the automated cutting of such difficult materials which in the industry are typically cut by hand. It is also important to note that there can be substantial savings in material too with the nesting of shapes. Consider that it was required to cut a large number of circles. These can now be placed in optimum patterns on the material instead of being cut from squares or rectangles, increasing yield by at least 4/pi or 27%. The savings in time and the increase in operator safety are significant as well. There is also no need to buy a specialist machine as all this can be done with the universal machine specified described by the author for long products including plate, sheet, sections, tubes and weld preparation.

In one embodiment, a Numerical Control (NC) cutting machine for plasma cutting a metal fabric includes a computer with a memory and a processor, a laser height measuring device, an NC program stored within the memory defining a cutting path, a fabric enabling software having machine readable instructions stored within the memory that when executed by the processor are capable of: controlling the NC cutting machine to make a first pass along the cutting path with the laser height measuring device to collect height data of the metal fabric positioned on a bed of the NC cutting machine; determining positions for starting and stopping a plasma arc of a cutting torch of the NC cutting machine based upon the height data; and generating an enhanced NC program based upon the NC program, the height data, and the starting and stopping positions to control the NC cutting machine to move the torch at an optimal cutting height over the metal fabric in a second pass along the cutting path to cut metal of the metal fabric.

In another embodiment, a method NC plasma cuts a metal fabric based upon a two-dimensional cutting path. An NC cutting machine is controlled to make a first pass along the cutting path with the laser height measuring device to collect height data from the metal fabric positioned on a bed of the NC cutting machine. Positions for starting and stopping a plasma arc of a cutting torch of the NC cutting machine are determined based upon the height data. An enhanced NC program is generated based upon the cutting path, the height data, and the positions for starting and stopping the plasma arc, to control the NC cutting machine to cut metal of the metal fabric along the cutting path.

BRIEF DESCRIPTION OF THE FIGURES

FIG. 2 shows exemplary expanded metal production from plate.

FIGS. 3A-3D show exemplary types of metal fabrics.

DETAILED DESCRIPTION OF THE EMBODIMENTS

Figure 1:
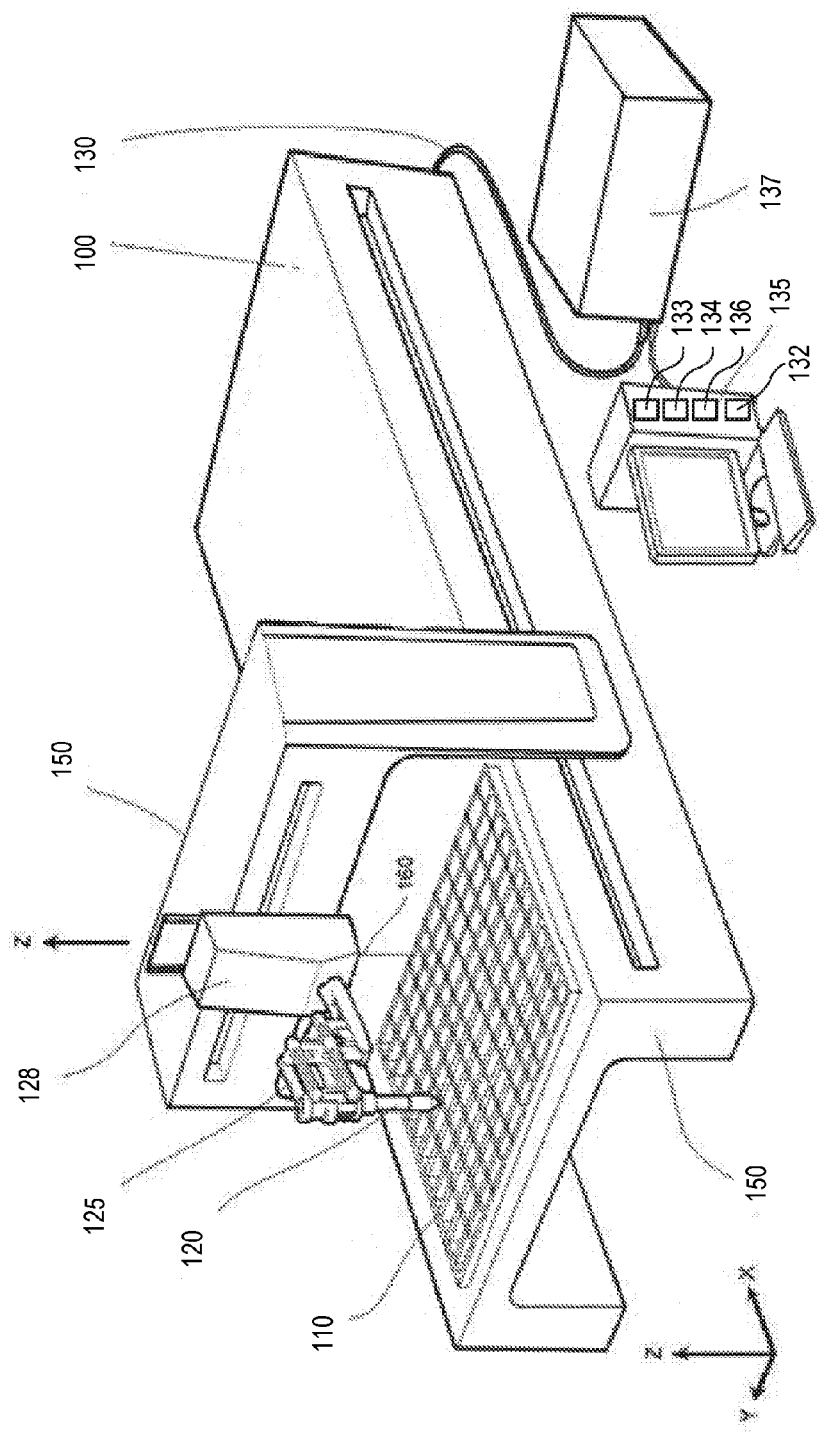
FIG. 1 shows one exemplary NC plasma gantry cutting machine preparing to cut a metal matrix material, in an embodiment.
Figure 7:
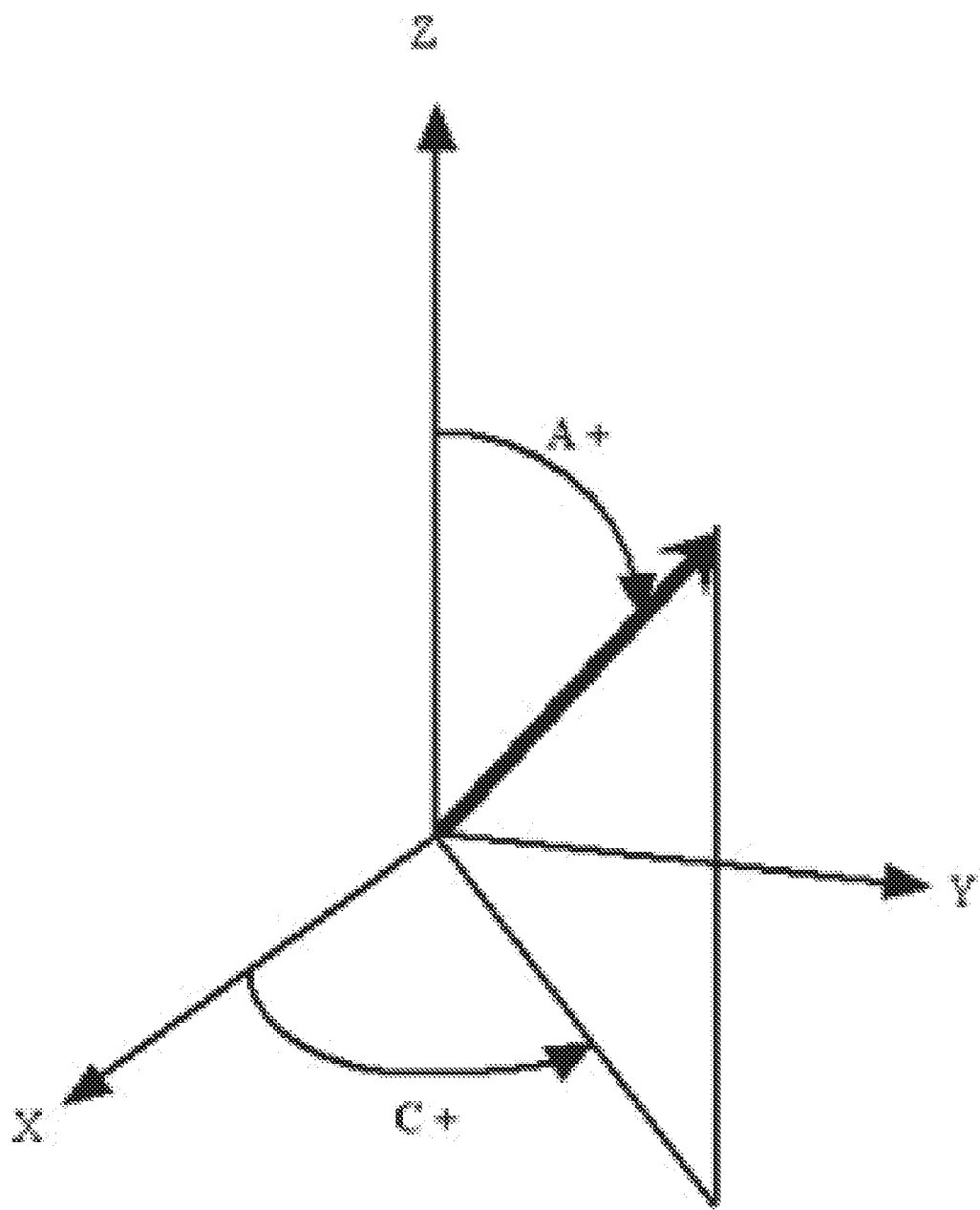
FIG. 7 illustrates torch azimuth C axis and polar tilt axis A for the bevel head plasma torch holder illustrated in FIG. 1.

FIG. 1 shows one exemplary NC plasma gantry style cutting machine with gantry (150) able to move in the X direction and a 3 axis bevel head (126) able to move in the Y direction on the gantry, covering the surface 100. Material 110 to be cut is placed on the bed 100 of an XY plasma torch (120) cutting machine. A laser 160 is included in the base of the bevel head drive box (128) and can look vertically down to measure the top of the material to be cut (110). There are many designs of bevel armature (125) and what is shown is a pantograph device which can tilt the torch in any direction about the tip of the torch without moving the machine. The axes for the bevel head are illustrated in FIG. 7. However it is important to note that the disclosed embodiments do not require a gantry machine or a specific design of bevel head but do require that the torch be moveable in XY and Z.

The movement of the torch in XYZ and optionally tilt directions AC is guided by a Numerical Control program (e.g., NC program 133) operating within a computer 135 which in turn controls axis amplifier in 137 and 128 to make the powered motions in XYZAC. Computer 135 has a memory and at least one processor.

This is all fairly conventional Numerically Controlled plasma cutting of metal plate. What is unusual is that the material to be cut is not solid and smooth metal plate but contains large holes and is a highly variable surface height which while often regular, is far from flat.

Examples of common materials to be cut are given in FIGS. 2 and 3. These are formed by the forging, welding and punching of metal plate, metal strips and metal bars variously. The most exotic fabrication is called expanded metal. It is manufactured by an incomplete hydraulic shearing motion which alternately pushes strips from solid plate (201) in V shapes as shown in FIG. 2. The shear pushes at 202 and creates wavy strips which expand the metal in the direction 203, alternating by half a V distance to create the lattice shown. This forms a much larger metal sheet with a fraction of the weight and enough strength to suit many applications. An aspect of this so called expanded metal is that the alternate faces of the thin strips are closer to vertical than horizontal, making the material thicker than the original and highly variable in surface angle. This makes it particularly difficult to cut by any technology as the material obviously has large holes, is compressible in one direction and hard to clamp and has a highly variable surface.

Figure 3B:
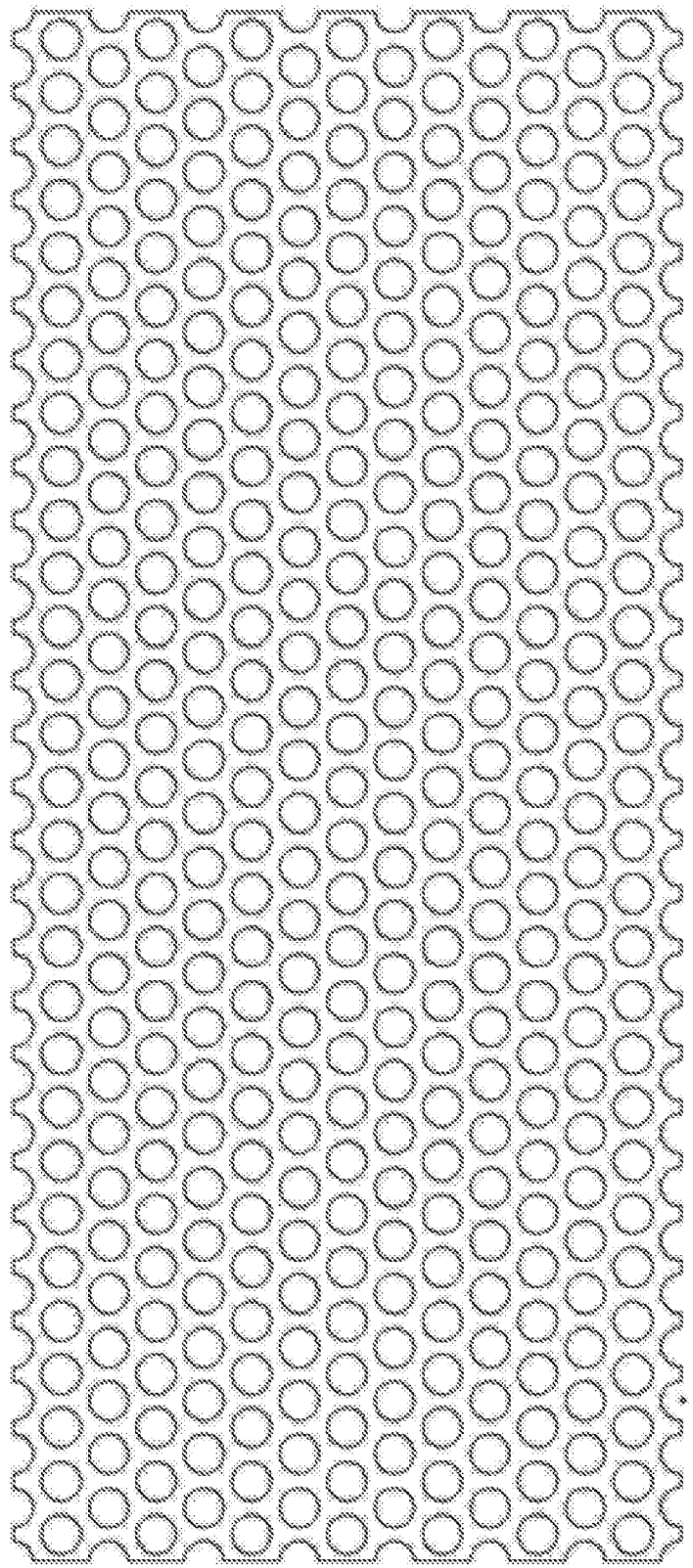
Figure 3C:
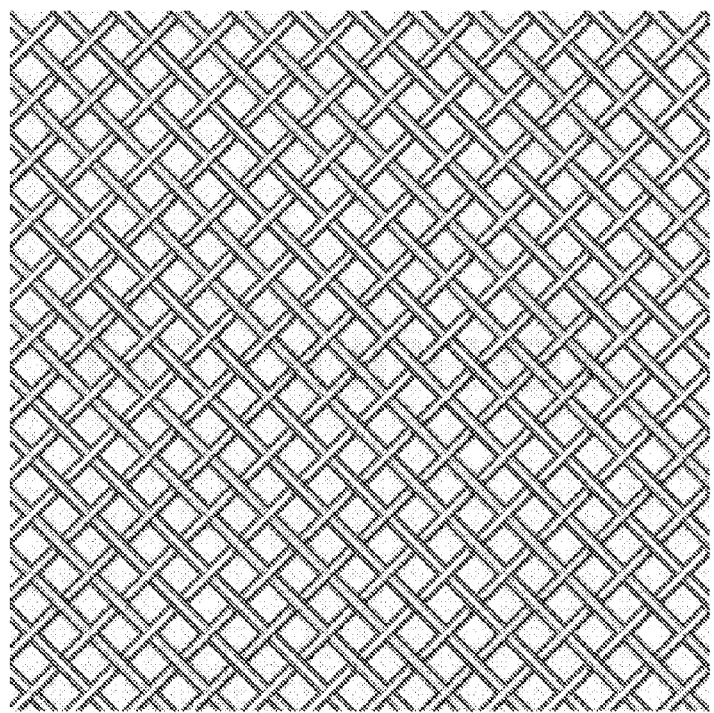
Figure 3D:
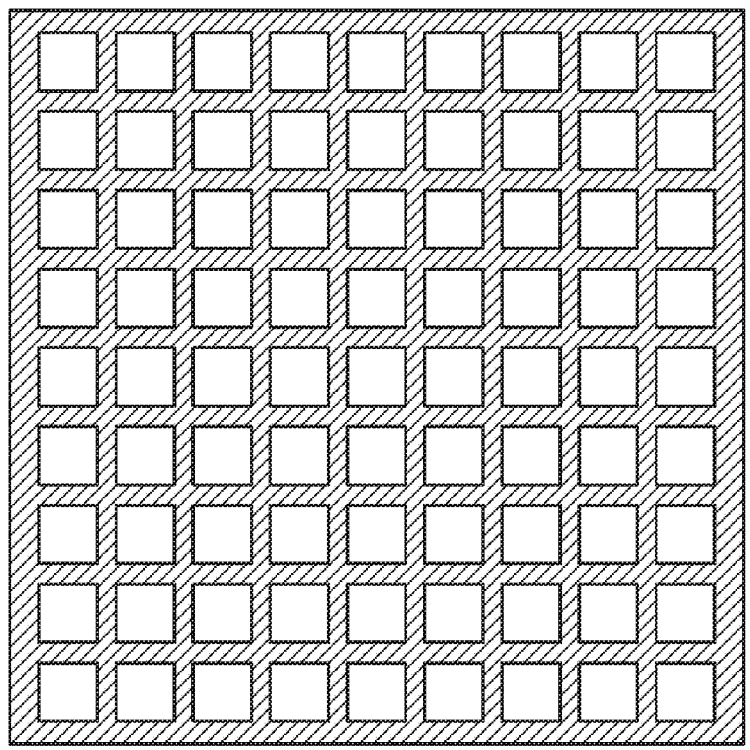

Various other manufactured lightweight materials as show in FIGS. 3A, 3B, 3C and 3D. Perhaps the most common is steel reinforcing produced in great quantity as a simple welded lattice of two different diameter rods. FIG. 3A shows two common walkway materials often used in outdoor areas such as on ships and industrial installations. One has serrated rods for grip. Both are formed by forging hot crossbars into vertical slats. FIG. 3B shows a punched plate with a lot of round holes. At least apart from the holes, this surface is flat and has only one major problem for plasma cutting, the proliferation of holes in any direction. Punched holes can be in any shape or pattern.

A different type of metal fabric is shown in FIG. 3C. This is a woven material and can take many forms but suffers from the dual problems of holes and variable height.

A fabric enabling software 132 within computer 135 uses NC program 133 to control laser measuring device 160 to make a first pass over workpiece 110, without cutting, to scan the workpiece 110 and generate height data 134 corresponding to an intended cutting path. Fabric enabling software 132 may include one or more algorithms for removing measurement anomalies from the height data 134 and for compressing, simplifying and/or smoothing the height data. Fabric enabling software 132 then adds the height data 134 to NC program 133 to generate enhanced NC program 136 that is capable of controlling cutting torch 120 in three dimensions XYZ, and capable of starting and stopping the plasma arc of the cutting torch to operate only over metal when following the cutting path defined in NC program 133.

Figure 4A:
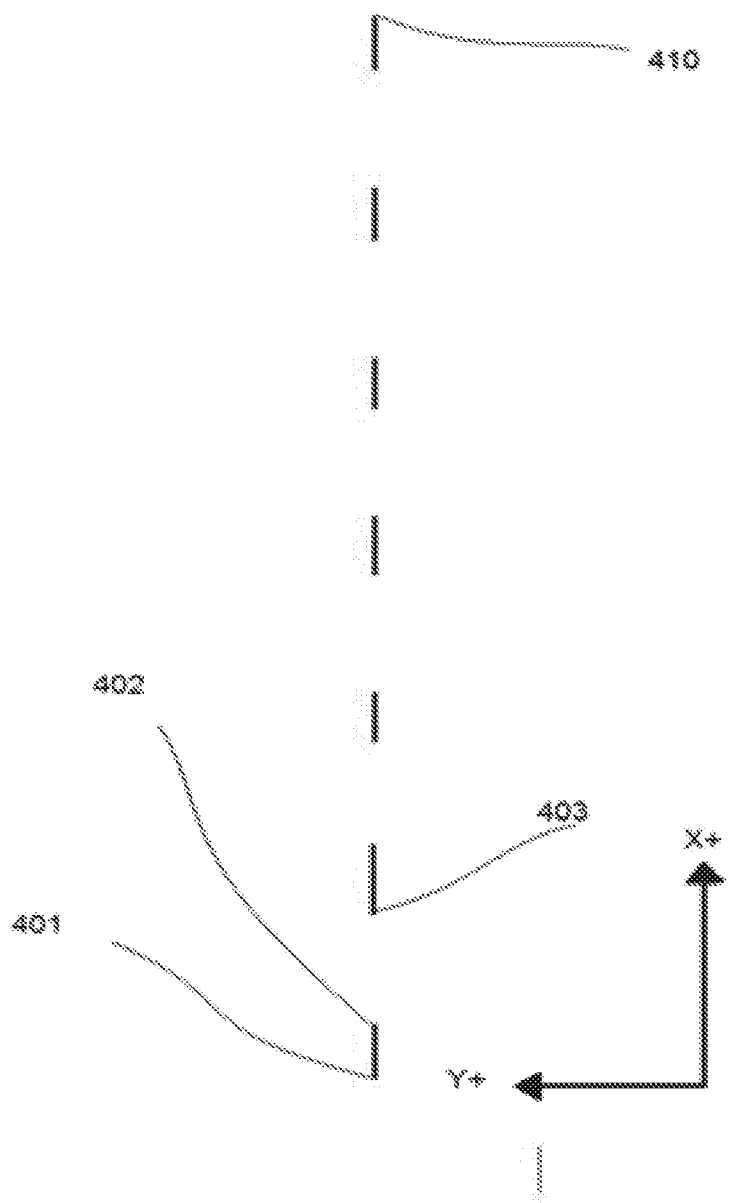
FIG. 4A shows one exemplary laser profile along a straight line through expanded metal.

Consider the cutting of material 3A in a line square to the expanded metal in FIG. 2. The scan in 2D in the XY plane shows regular bars as seen in FIG. 4A. At the point 401 the plasma arc can be started, starting easily on the edge of the metal with a vertical torch. It can then cut to point 402 at which point the torch has to be programmed to turn off. A rapid traverse can then be made to point 403 where the process is repeated. This is done repeatedly in cutting the line from 401 to 410 as required. So what was initially a straight line cut has in fact become a series of 8 cuts from 401 to 410 with 8 points where the torch is turned on and 8 points where it is turned off, eliminating a fundamental problem for plasma cutting this material.

Figure 4B:
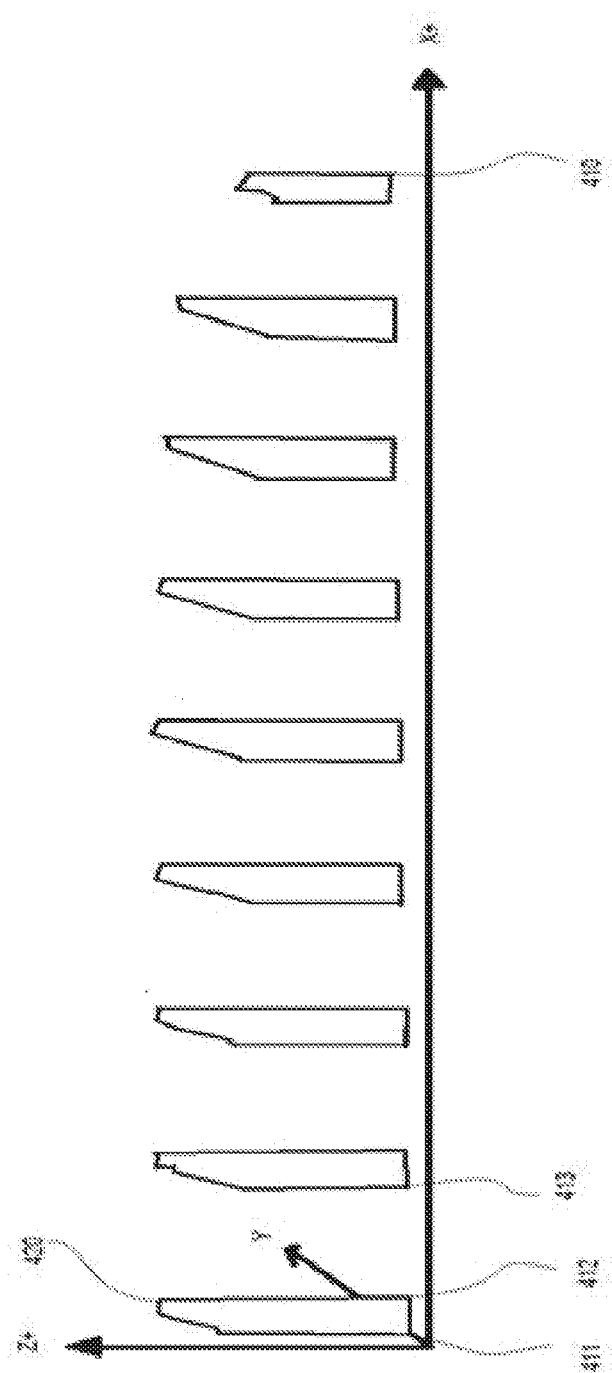
FIG. 4B shows one exemplary line profile with Z contour height.

The second problem, torch height, is shown in FIG. 4B. Here the bars to be cut are seen in profile to scale and each bar is seen to have a highly variable top consisting of a very sloped face from left to right and a short plateau. The last bar is substantially lower. This means the torch path is not only known in XY but also in Z as shown. Typically the torch tip has to be within 6 mm-10 mm of the top of the bar and this can be achieved with NC blocks which include XY and Z values.

The holes in the material provide the possibility of near instant cutting at the edge and there is no need for exits. The cylindrical nature of the plasma column means that the torch may be started a few mm into the material and turned off a few mm from the edge as the column diameter for the hot plasma is often 2-4 mm.

It is to be noted that there is no requirement for entries and exits as commonly used in plate cutting as there is no need for piercing the material. This is an advantage for rapid cutting against plate cutting, making the cutting of fabricated metal perhaps faster than traditional plate cutting. As the points for edge start and stop or well known to high precision, damage to the torch should be eliminated.

Of course there is also the possibility with a torch tilt to pre tilt the torch so avoid collisions with the near vertical bars by inclining the torch, as will be discussed later, but this is an optional improvement possible but not essential to the disclosed embodiments for cutting such fabricated material. Other materials such as punched or forged or cast flat plate 3b and 3d do not have a varying height, although compensation may have to be made for varying height due to the angle of the material 110 on the bed 100 in FIG. 1. The material may also be warped or bent and this requires slower but necessary Z adjustment while cutting. Care must also be made to offset the path as usual by half the cut width on the scrap side when cutting so that correct component or hole size is achieved as in normal NC cutting.

Figure 5A:
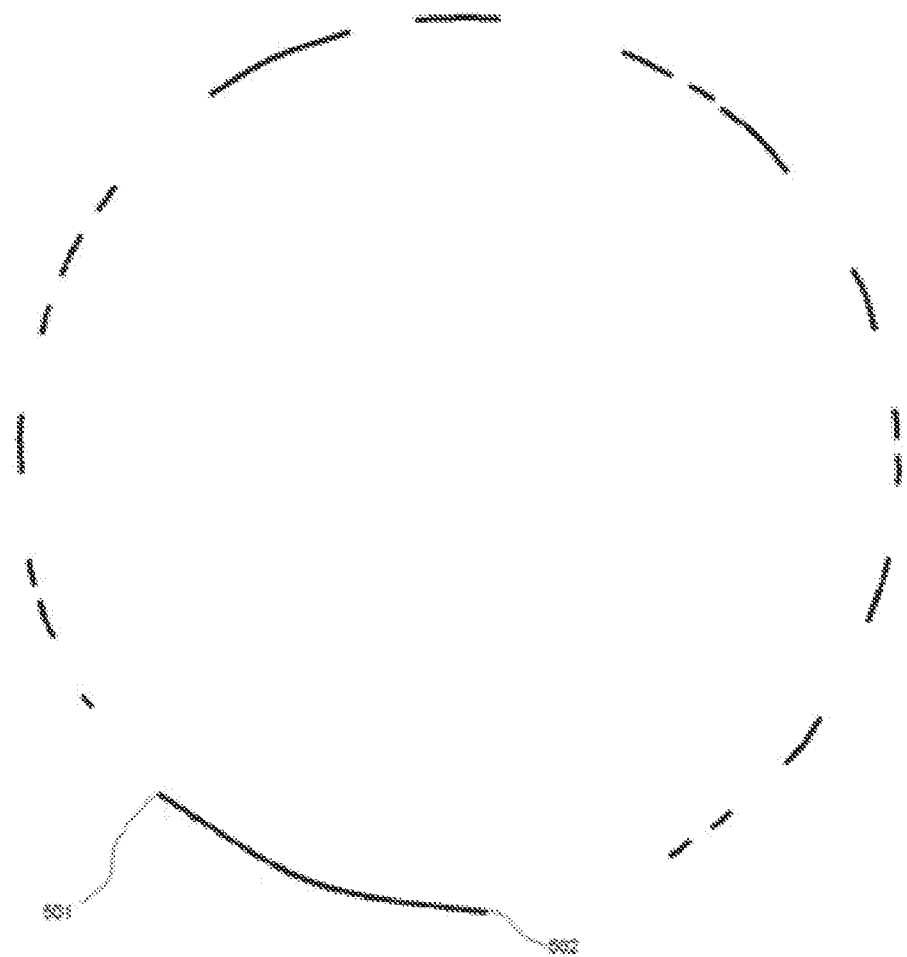
FIG. 5A. shows one exemplary scan in XY of a circle over crossbar and bearing grate.
Figure 5B:
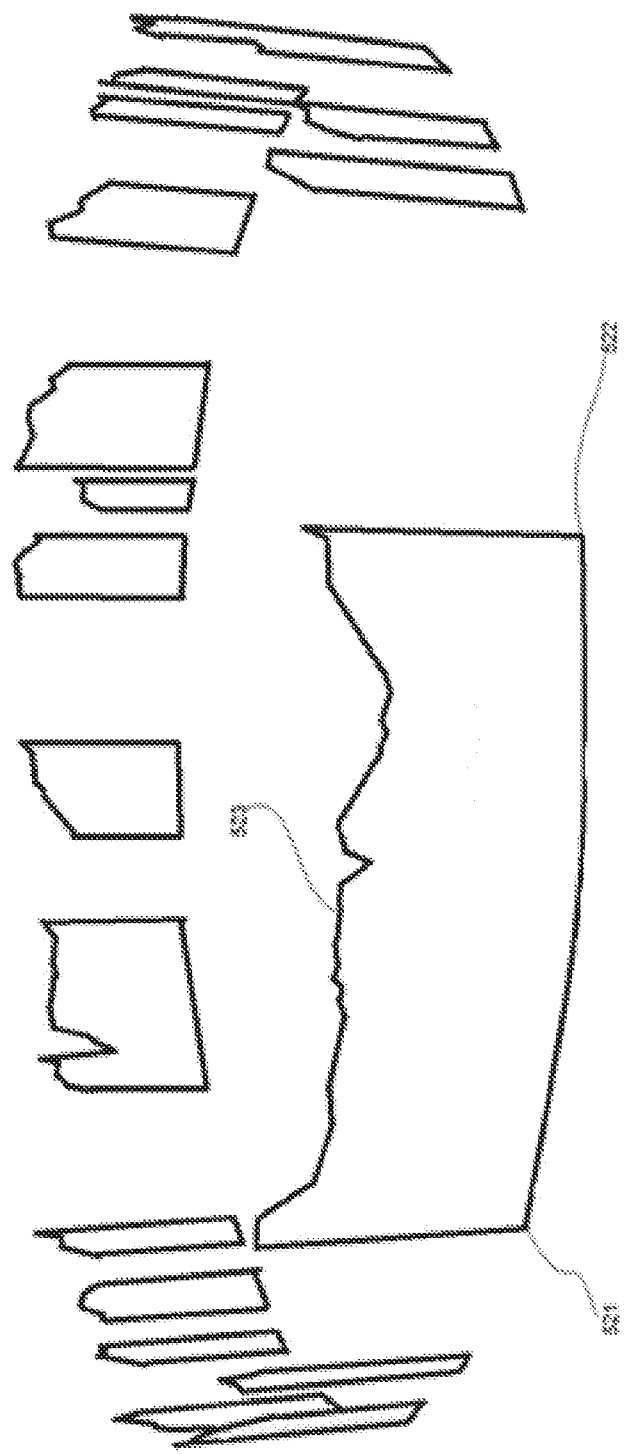
FIG. 5B shows a scan profile illustrating Z contour height, in an embodiment.

A more complex path on the same material is shown in FIG. 5A, a circular cut path which produces a very complex XY path where some cut segments are quite long and others very short. This path is basically unpredictable for a given circle on this material but can easily be determined by software 132 using the vertical laser scanning as described. The dramatic profile is illustrated in FIG. 5B showing the long section 501 to 502 has a complex Z surface 523 which must be followed to within a few mm for the plasma arc to continue.

Figure 6:
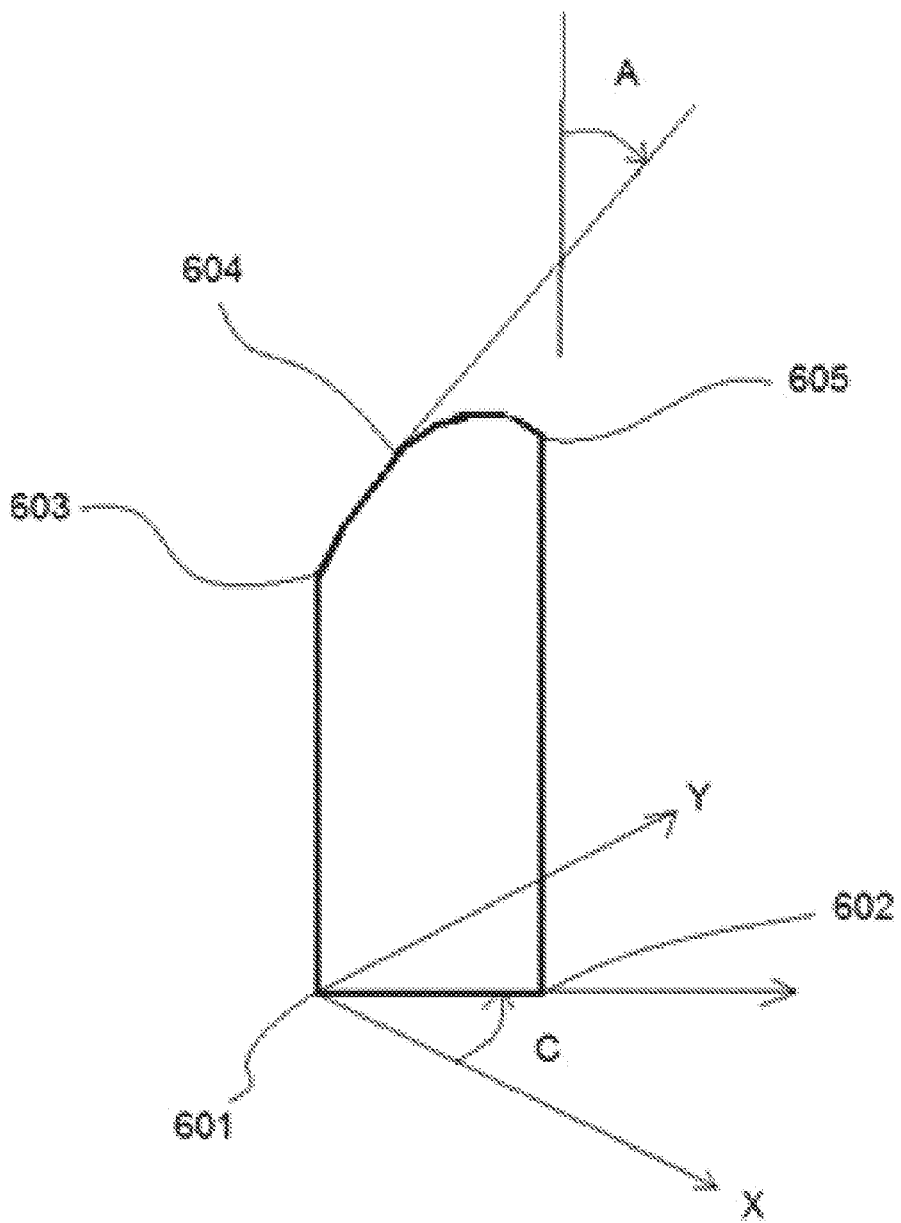
FIG. 6 illustrates optional setting of torch azimuth and tilt from analysis of the scan profile, in an embodiment.

FIG. 6 shows the determination of the slope A of a segment of a scan from 601 to 602. The slope from 603 to 604 can be determined as having angle A to the vertical. Similarly the slope from 604 to 605 is closer to horizontal. The significance is that in expanded metal the slope can be near vertical while the tip of the torch has an angle of between 45 and 55 degrees, so to reach the surface at 603, it is advisable to tilt the torch by an amount up to the value of A or less than A. This can enable the torch to remain within the prescribed plasma arc distance while the torch tip does not collide with the surface between 603 and 604. The angle of this tilt, the azimuth C as shown can be determined by the XY direction of the cut along 602.

This accommodation for highly sloped edges is a refinement to the disclosed embodiments for more complex materials and requires a bevel or torch tilting device which performs a function similar to the pantograph device (125) in FIG. 1.

FIG. 7 documents the polar tilt axis A and azimuth axis C required to orient the torch. In this embodiment using a pantograph device these angles are effected by the motorized tilt of the opening and closing of the pantograph 125 and motorized swiveling around the main pantograph axis shaft through box 128. Both are controlled by servo drives in the box 128 but this is only one of many potential devices used to control torch tilt and azimuth and not of itself essential to the disclosed embodiments.

Overall the use of a dual pass approach to determine the plasma path and then cut unpredictable material like the many types of fabricated metals with holes and highly variable and unpredictable surfaces will make processing these metals simple, fast and safe enabling the elimination of dangerous, slow and wasteful manual cutting with saws, grinders, shears and hand torches.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A Numerical Control (NC) cutting machine for plasma cutting a metal fabric, comprising:
   a computer having a memory and a processor;
   a laser height measuring device;
   an NC program stored within the memory defining a cutting path; and
   a fabric enabling software having machine readable instructions stored within the memory that when executed by the processor are capable of:
      controlling the NC cutting machine to make a first pass along the cutting path with the laser height measuring device to collect height data of the metal fabric positioned on a bed of the NC cutting machine;

determining a plurality of positions for starting and stopping a plasma arc of a cutting torch of the NC cutting machine based upon the height data; and generating an enhanced NC program based upon the NC program, the height data, and the starting and stopping positions to control the NC cutting machine to move the torch at an optimal cutting height over the metal fabric in a second pass along the cutting path to cut metal of the metal fabric;

wherein the metal fabric comprises one or more of concrete reinforcing grid, expanded metal, crossbar and bearing grating, punched sheet, woven materials, and forged materials; and wherein the enhanced NC program operates the arc of the cutting torch only when over metal of the metal fabric.

2. The NC cutting machine of claim 1, wherein the laser height measuring device during the first pass and the torch during the second pass follow the same cutting path.

3. The NC cutting machine of claim 1, wherein the enhanced NC program is generated to control the height of the torch above the metal fabric to facilitate plasma cutting of the metal fabric.

4. The NC cutting machine of claim 1, the fabric enabling software having machine readable instructions stored within the memory that when executed by the processor are further capable of:

determining optimum plasma torch angle and orientation for sloped surfaces of the metal fabric based upon the height data; and generating the enhanced NC program to control the torch to have the optimum torch angle and orientation during the second pass.

5. The NC cutting machine of claim 1, wherein the NC program is a two dimensional XY NC program that does not include height information of the metal fabric.

6. The NC cutting machine of claim 1, wherein the fabric enabling software, based upon the height data, generates the enhanced NC program without prior knowledge of the position of the metal fabric on the NC cutting machine.

7. The NC cutting machine of claim 1, wherein the fabric enabling software, based upon the height data, generates the enhanced NC program to enable the cutting machine to cut the metal fabric without prior knowledge of the type, shape, orientation, and position of the metal fabric.

8. The NC cutting machine of claim 1, wherein the NC cutting machine is any type of NC cutting machine that include a laser height measuring device.

9. The NC cutting machine of claim 1, the fabric enabling software having machine readable instructions stored within the memory that when executed by the processor are further capable of:

generating the enhanced NC program with part nesting to increase the yield from the metal fabric when a number of shapes are to be cut from one sheet of the metal fabric.

10. The NC cutting machine of claim 1, wherein the enhanced NC program includes rapid traverse of the cutting torch over holes in the metal fabric, locations of the holes being determined from the height data.

11. The A Numerical Control (NC) cutting machine for plasma cutting a metal fabric, comprising:

a computer having a memory and a processor;
a laser height measuring device;
an NC program stored within the memory defining a cutting path; and a fabric enabling software having machine readable instructions stored within the memory that when executed by the processor are capable of:

controlling the NC cutting machine to make a first pass along the cutting path with the laser height measuring device to collect height data of the metal fabric positioned on a bed of the NC cutting machine;

determining positions for starting and stopping a plasma arc of a cutting torch of the NC cutting machine based upon the height data; and generating an enhanced NC program based upon the NC program, the height data, and the starting and stopping positions to control the NC cutting machine to move the torch at an optimal cutting height over the metal fabric in a second pass along the cutting path to cut metal of the metal fabric;

wherein the fabric enabling software has machine readable instructions stored within the memory that when executed by the processor are further capable of:

implementing one or more algorithms to remove or correct wrong laser measurements within the height data corresponding to metal edges of the metal fabric; and implementing one or more algorithms to smooth and simplify the height data for the use in generating the enhanced NC program.

12. A method for NC plasma cutting of a metal fabric based upon a two-dimensional cutting path, comprising the steps of:

controlling an NC cutting machine to make a first pass along the cutting path with the laser height measuring device to collect height data from the metal fabric positioned on a bed of the NC cutting machine;

determining a plurality of positions for starting and a plurality of positions for stopping a plasma arc of a cutting torch of the NC cutting machine based upon the height data; and generating an enhanced NC program based upon the cutting path, the height data, and the positions for starting and stopping the plasma arc, to control the NC cutting machine to cut metal of the metal fabric along the cutting path;

wherein the metal fabric comprises one or more of concrete reinforcing grid, expanded metal, crossbar and bearing grating, punched sheet, woven materials, and forged materials.

13. The method of claim 12, the step of generating further comprising adding the height data to the two-dimensional cutting path to position the cutting torch at an optimal cutting height above the metal fabric when traversing the cutting path.

14. The method of claim 12, further comprising controlling the NC cutting machine, based upon the enhance NC program, to cut the metal fabric along the cutting path without damage to the NC cutting machine due to holes in the metal fabric.

15. The method of claim 12, wherein the enhanced NC program operates the arc of the cutting torch only when over metal of the metal fabric.

16. The method of claim 12, further comprising:

determining optimum plasma torch angle and orientation for sloped surfaces of the metal fabric based upon the height data; and generating the enhanced NC program to control the torch to have the optimum torch angle and orientation along the cutting path.

17. The method of claim 12, further comprising implementing one or more algorithms to smooth and simplify the height data for the use in generating the enhanced NC program.

18. The method of claim 12, wherein the enhanced NC program includes rapid traverse of the cutting torch over holes in the metal fabric, locations of the holes being determined from the height data.

19. A method for NC plasma cutting of a metal fabric based upon a two-dimensional cutting path, comprising the steps of:

controlling an NC cutting machine to make a first pass along the cutting path with the laser height measuring device to collect height data from the metal fabric positioned on a bed of the NC cutting machine;

determining positions for starting and stopping a plasma arc of a cutting torch of the NC cutting machine based upon the height data; and generating an enhanced NC program based upon the cutting path, the height data, and the positions for starting and stopping the plasma arc, to control the NC cutting machine to cut metal of the metal fabric along the cutting path; and implementing one or more algorithms to remove or correct wrong laser measurements in the height data corresponding to metal edges of the metal fabric.

\* \* \* \* \*